H. W. OSTROM.
COMBINED WEATHER STRIP AND DOOR JAMB.
APPLICATION FILED FEB. 10, 1912.
1,053,638.
Patented Feb. 18, 1913.
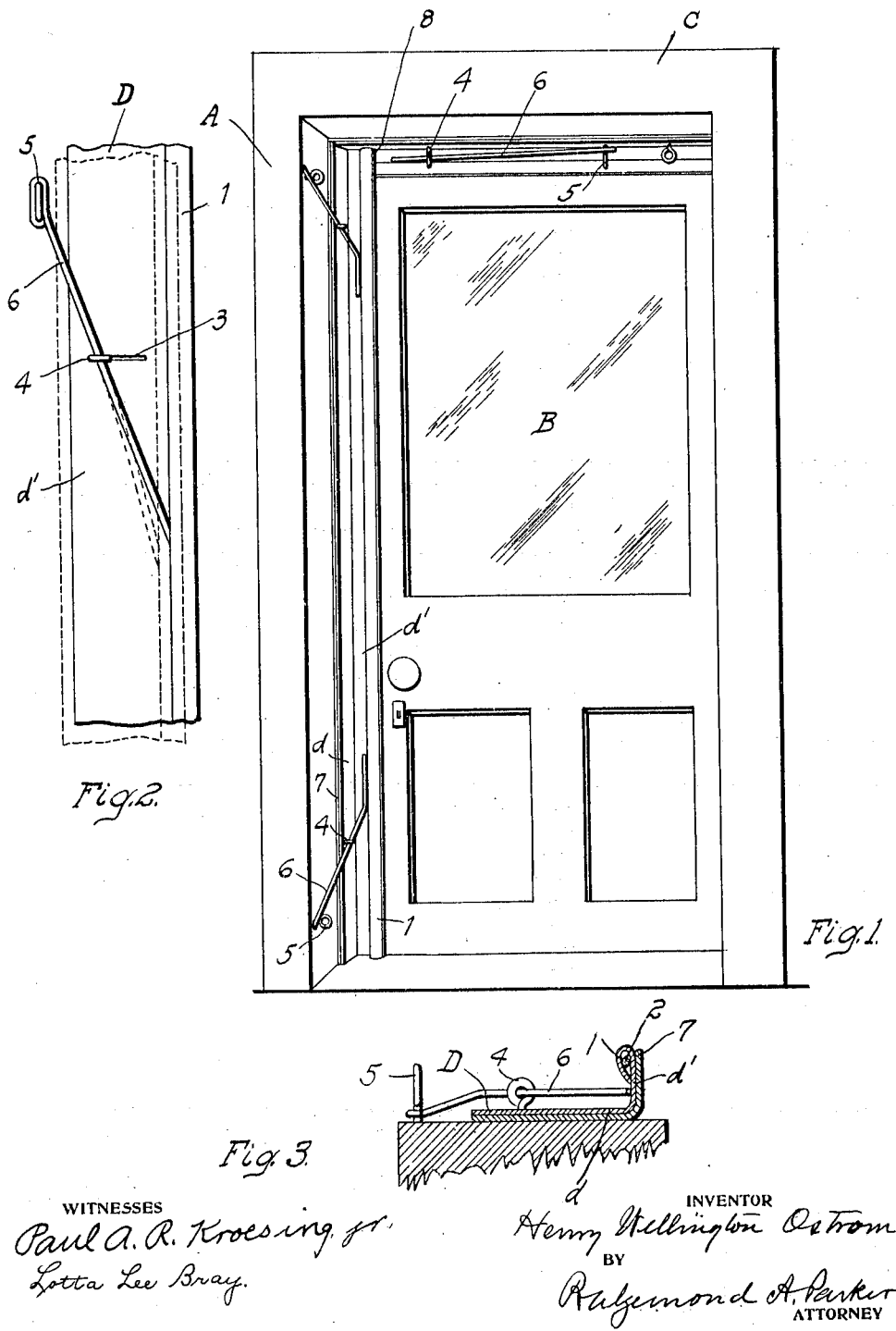

UNITED STATES PATENT OFFICE.

HENRY WELLINGTON OSTROM, OF AVON TOWNSHIP, OAKLAND COUNTY, MICHIGAN.

COMBINED WEATHER-STRIP AND DOOR-JAMB.

1,053,638.   Specification of Letters Patent.   Patented Feb. 18, 1913.

Application filed February 10, 1912. Serial No. 676,784.

*To all whom it may concern:*

Be it known that I, HENRY WELLINGTON OSTROM, a citizen of the United States, residing in the township of Avon, county of Oakland, State of Michigan, have invented a certain new and useful Improvement in Combined Weather-Strips and Door-Jambs, and declare the following to be a full, clear, and exact description of the same, such as will enable others skilled in the art to which it pertains to make and use the same, reference being had to the accompanying drawings, which form a part of this specification.

This invention relates to combined weather strips and door jambs and has for its object a door jamb and weather strip which is economically constructed and can be applied to any door by screwing screw-eyes into the door frame.

In the drawings:—Figure 1, is a perspective of my invention applied to a door frame. Fig. 2, is an elevation of a portion of the weather strip and door jamb. Fig. 3, is a cross section of the strip applied to the door frame.

The strip is applied to the side frame bar A, against which the door B, closes and the top frame bar C, against which the door also closes and, if need be, it may be applied to the two other frame bars forming the door frame. It consists essentially of an angled metal strip D, as shown in cross section in Fig. 3, a portion $d$ of which is adapted to lie adjacent to the frame bar and a portion of which is bent out into a right angle flange $d'$ and then bent over a stiffening wire 2 to form a bead 1. This strip D, is slotted at intervals, as at 3 in Fig. 1. It is shown as slotted at two places in the vertical strip that is attached to the side frame bar. Through these slots screw-eyes 4 are passed and adjacent thereto, a second screw-eye 5 is screwed into the frame bar, and about this screw eye 5, a wire spring 6 is attached and passed through the screw eye 4, its free end engaging against the flanged portion $d'$ of the strip. The bead 1 not only serves as a suitable edge for the strip, but also prevents the wire spring 6 from slipping off of the beaded strip. It will be noted that the screw eye 4 serves as a guide by engaging in the slot of the strip D and that the wire spring 6 serves not only to give a yielding action to the strip, but also, in connection with the screw eye 4, holds the strip to the frame. A piece of felt or other cushioning fabric 7 is preferably attached to the strip, engaging under the portion $d$ of the strip that is adjacent to the door frame and it is also attached to the flanged portion $d'$. It may be fastened to the strip either by gluing, wire or otherwise.

A construction of the strip at the top of the door frame is substantially similar to the construction described with respect to the side door frame, except that the flanged portion $d'$ of the strip is cut away at the corner 8, so as to allow a joint with the side strips, while the portion $d$ of the strip, that lies adjacent to the frame bar contacts the same portion $d$ of the side strip. From the above description, it is seen that these strips are capable of a limited yielding movement, as shown in Fig. 2. This keeps the strip tightly in contact with the door when the door is latched, as the strip is so set with respect to the location of the latch in the door frame that in closing and latching, the door compels the strip to be pressed back against the spring tension afforded by the spring 6, and the tendency to tip the strip, due to the door striking the outside of the flange $d'$, causes the portion $d$ to even more securely contact the side of the frame. This yielding strip also affords a suitable door jamb, for, if the door is slammed hard the yielding strip will serve to deaden the shock.

What I claim is:—

1. A combined weather strip and door jamb, having in combination, an angled strip, the portion of the strip at one side of the angle being transversely slotted and lying contiguous to the door frame and the portion on the other side of the angle adapted to receive the impact of the door and engage the door when the same is closed, a screw-eye passing through each of the slots of the slotted portion and screwed into the door frame, straight wire springs fastened at one end to the door frame, obliquely crossing the portion of the strip contiguous to the door, passing through the eye of the adjacent screw-eye and engaging with the other end the rear of the strip-portion against which the door jambs, the said wire, thereby, having a stiffener and slidable guide in the screw-eye and adapted in connection with the screw-eye to slidably hold the strip to the door frame, substantially as described.

2. A combined weather strip and door jamb, having in combination, an angled strip, the portion at one side of the angle being transversely slotted and lying contiguous to the door frame and the portion on the other side of the angle being beaded by folding the edge of the strip over and being adapted to be encountered by the door, screw-eyes passing through the slots and screwed into the door frame, and straight wire springs fastened at one end to the door frame, obliquely crossing the strip-portion contiguous the door frame, passing through the eye of the adjacent screw-eye and engaging with the other end the rear of the strip-portion against which the door jambs, the said beaded portion being adapted to guide the end of the spring that encounters the weather strip as it slides when the strip is impacted by the door and the said screw-eye being adapted to hold the spring against the strip and act as a slidable guide and stiffener for it, substantially as described.

In testimony whereof, I sign this specification in the presence of two witnesses.

HENRY WELLINGTON OSTROM.

Witnesses:
LOTTA LEE BRAY,
R. A. PARKER.